United States Patent
Kassai et al.

(10) Patent No.: US 7,753,445 B2
(45) Date of Patent: Jul. 13, 2010

(54) AUTOMOBILE CHILD SEAT

(75) Inventors: Kenzou Kassai, Osaka (JP); Haruo Kawano, Tenri (JP)

(73) Assignee: Aprica Children's Products Inc., Osaka (JP)

( * ) Notice: Subject to any disclaimer, the term of this patent is extended or adjusted under 35 U.S.C. 154(b) by 0 days.

(21) Appl. No.: 12/315,768

(22) Filed: Dec. 5, 2008

(65) Prior Publication Data

US 2009/0184549 A1    Jul. 23, 2009

(30) Foreign Application Priority Data

Jan. 18, 2008    (JP)    ............................... 2008-009166

(51) Int. Cl.
*A47C 1/08*    (2006.01)
*A47D 15/00*    (2006.01)

(52) U.S. Cl. ............................. 297/256.16; 297/256.12; 297/253

(58) Field of Classification Search ......... 297/253–255, 297/256.1–256.16, 250.1, 464
See application file for complete search history.

(56) References Cited

U.S. PATENT DOCUMENTS

| | | | | |
|---|---|---|---|---|
| 4,480,870 | A | * | 11/1984 | von Wimmersperg .. 297/216.11 |
| 4,640,545 | A | * | 2/1987 | von Wimmersperg .. 297/216.11 |
| 4,718,722 | A | * | 1/1988 | Kassai ..................... 297/250.1 |
| 5,487,588 | A | * | 1/1996 | Burleigh et al. .............. 297/253 |
| 5,524,965 | A | * | 6/1996 | Barley .................... 297/256.16 |
| 5,820,215 | A | * | 10/1998 | Dreisbach .............. 297/256.16 |
| 6,196,629 | B1 | | 3/2001 | Onishi et al. |
| 6,237,999 | B1 | * | 5/2001 | Hobson .................. 297/256.15 |
| 6,520,579 | B2 | * | 2/2003 | Kassai et al. ........... 297/256.12 |
| 6,860,557 | B2 | * | 3/2005 | Jonasson ..................... 297/253 |
| 7,097,245 | B2 | * | 8/2006 | Barker .................... 297/256.14 |
| 7,328,946 | B2 | * | 2/2008 | Hendrikus Van Montfort et al. ...... 297/253 |
| 2008/0224516 | A1 | * | 9/2008 | Vegt ...................... 297/256.16 |

FOREIGN PATENT DOCUMENTS

| | | |
|---|---|---|
| JP | 10-250426 | 9/1998 |
| JP | 2003-094994 | 4/2003 |
| WO | WO 2007/029010 | 3/2007 |

* cited by examiner

*Primary Examiner*—David Dunn
*Assistant Examiner*—Erika Garrett
(74) *Attorney, Agent, or Firm*—Lempia Braidwood LLC

(57) ABSTRACT

A child seat includes: a base member; a seat body switchable at least between a forward facing state and a sideways facing state in a bed shape on the base member; a prop or strut member attached to a front end of the base member and extending to a position where the prop member abuts on a floor of an automobile; and a rigid bar-shaped support member supported by the prop member so as to be displaceable between an upper position and a lower position. A side engagement portion is provided in a side surface of the seat body. The side engagement portion engages with the support member when the support member is brought to the upper position in the sideways facing state in the bed shape.

11 Claims, 11 Drawing Sheets

AUTOMOBILE CHILD SEAT

BACKGROUND OF THE INVENTION

1. Field of the Invention

The present invention relates to an automobile child seat that is secured to a seat of an automobile by using a seat belt mounted on the automobile.

2. Description of the Background Art

Automobile child seats are disclosed in, for example, Japanese Patent Publication Nos. 2003-94994 and H10-250426 of unexamined applications.

A seat belt mounted on a vehicle is generally used as means for fixing a child seat to a seat of the vehicle. In the case where a child seat is fixed to a seat of a vehicle by using only a seat belt, the child seat sometimes tilts forward and becomes unstable in case of sudden braking operation, front collision, and the like. Japanese Patent Publication No. 2003-94994 of unexamined applications discloses a structure of a support leg of a child seat. The support leg functioning as a tension rod is mounted to the front part of the child seat in order to prevent such forward tilting of the child seat. Since a lower end of the support leg abuts on the floor of a vehicle, frontward tilting of the child seat is prevented.

Japanese Patent Publication No. H10-250426 of unexamined applications discloses an automobile child seat capable of being used for newborns, infants, toddlers, and even school-age children. In order to enable such long-term use, the child seat includes a base body and a seat body rotatably supported by the base body. The seat body includes a seat portion and a reclinable backrest portion. The child seat secured to a seat of an automobile is selectively switchable among a state in which the seat body faces sideways in a bed shape, a state in which the seat body faces rearward in a chair shape, and a state in which the seat body faces forward in a chair shape.

In view of the teaching of Japanese Patent Publication No. 2003-94994 of unexamined applications, it can be considered to attach a support leg for preventing forward tilting to the base body disclosed in Japanese Patent Publication No. H10-250426 of unexamined applications.

Such products have actually already been on the market. However, since an upper end of the support leg is fixedly connected to the base body, the support body cannot effectively prevent forward tilting of the seat body located on the base body. When the seat body is positioned in the forward facing direction in the chair shape, forward tilting of the seat body is prevented by fixing a back wall of the seat body and a standing wall of the base body. When the seat body is positioned in the sideways direction in the bed shape or positioned in the rearward facing direction in the chair shape, on the other hand, a seat belt mounted on a vehicle is threaded through several parts of the seat body and securely fixed in order to prevent forward tilting of the seat body.

Accordingly, the layout (threading path) of the automobile seat belt needs to be changed every time the direction and shape of the seat body are changed. Moreover, the seat belt mounted on the vehicle needs to be released when a child is placed in or taken out of the child seat. Such an operation is troublesome for a user.

SUMMARY OF THE INVENTION

It is an object of the present invention to provide an automobile child seat capable of preventing forward tilting of a seat body without changing the layout of a seat belt mounted on a vehicle even when the direction and shape of the seat body are changed.

An automobile child seat according to one aspect of the present invention includes: a base member fixedly secured to a seat of an automobile; a seat body attached to the base member and switchable at least between a forward facing state and a sideways facing state in a bed shape; a prop or strut member attached to a front end of the base member and extending to a position where the prop or strut member abuts on a floor of the automobile; and a rigid bar-shaped support member supported by the prop member so as to be displaceable between an upper position and a lower position. A side engagement portion is provided in a side surface of the seat body, and the side engagement portion engages with the support member when the support member is brought to the upper position in the sideways facing state in the bed shape. The prop or strut member is alternatively referred to as a tension member herein.

The base member of the child seat is secured to a seat of a vehicle by using a seat belt mounted on the vehicle. When the seat body is brought into the forward facing state in the bed shape on the base member, the support member is extended from the tension member and an upper end of the support member is engaged with the side engagement portion of the seat body. This engagement can prevent forward tilting of the seat body when the seat body is in the forward facing state in the bed shape.

In a preferred embodiment, the seat body is switchable to a rearward facing state in addition to the forward facing state and the sideways facing state in the bed shape. In this case, a back engagement portion is provided on a back surface of the seat body. The back engagement portion engages with the support member when the support body is brought to the upper position in the rearward facing state. According to this embodiment, the support member prevents forward tilting of the seat body in the rearward facing state.

For example, the prop or strut member, i.e. the so-called tension member has a pipe shape, and the support member has a bar shape so that the support member can be received in the pipe-shaped tension member so as to be displaceable in an up-down direction.

Preferably, the tension member has a U shape formed by two longitudinal bar portions extending in an up-down direction and spaced apart from each other and a transverse bar portion connecting respective lower ends of the two longitudinal bar portions to each other, and the support member includes first and second support bars respectively supported by the two longitudinal bar portions so as to be displaceable in the up-down direction.

Preferably, the side engagement portion is provided in both side surfaces of the seat body. According to this embodiment, when the seat body is in the sideways facing state in the bed shape, forward tilting of the seat body can be prevented regardless of whether the right or left side surface of the seat body faces forward.

Preferably, the seat body is switchable to a rearward facing state in addition to the forward facing state and the sideways facing state. In this case, first and second back engagement portions are provided on the back surface of the seat body, and the first and second back engagement portions respectively engage with the first and second support bars when the first and second support bars are brought to the upper position in the rearward facing state.

In one embodiment, the seat body is rotatably supported on the base member. In another embodiment, the seat body may be detachably attached to the base member.

An automobile child seat according to another aspect of the present invention includes: a base member fixedly secured to a seat of an automobile; a seat body attached to the base member and switchable at least between a forward facing state and a rearward facing state; a prop or strut member, i.e. a so-called tension member attached to a front end of the base member and extending to a position where the tension member abuts on a floor of the automobile; and a rigid bar-shaped support member supported by the tension member so as to be displaceable between an upper position and a lower position. A back engagement portion is provided on a back surface of the seat body, and the back engagement portion engages with the support member when the support member is brought to the upper position in the rearward facing state. Preferably, the tension member has a pipe shape, and the support member has a bar shape so that the support member can be received in the pipe-shaped tension member so as to be displaceable in an up-down direction. Preferably, the tension member has a U shape formed by two longitudinal bar portions extending in an up-down direction and spaced apart from each other and a transverse bar portion connecting respective lower ends of the two longitudinal bar portions to each other, and the support member includes first and second support bars respectively supported by the two longitudinal bar portions so as to be displaceable in the up-down direction.

An automobile child seat according to still another aspect of the present invention includes: a base member fixedly secured to a seat of an automobile; a seat body attached to the base member; a prop or strut member, i.e. a so-called tension member attached to a front end of the base member and extending to a position where the tension member abuts on a floor of the automobile; and a rigid bar-shaped support member supported by the tension member so as to be displaceable between an upper position and a lower position. An engagement portion is provided on the seat body, and the engagement portion engages with the support member when the support member is brought to the upper position.

DESCRIPTION OF THE PREFERRED EMBODIMENTS

Figure 1:
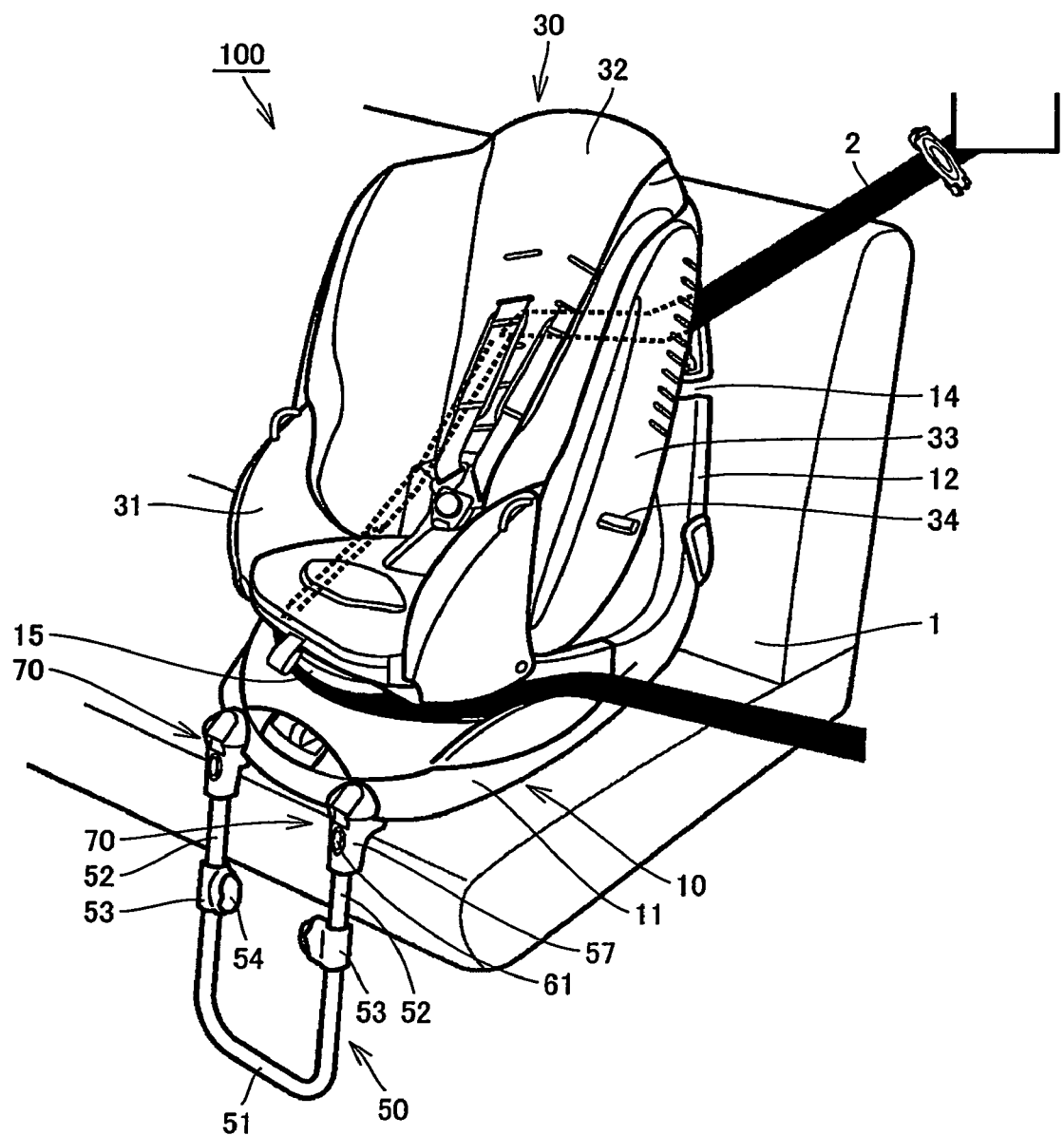
FIG. 1 is a perspective view showing a state in which a child seat according to an embodiment of the present invention is secured to a seat of a vehicle in a forward facing direction.
Figure 2:
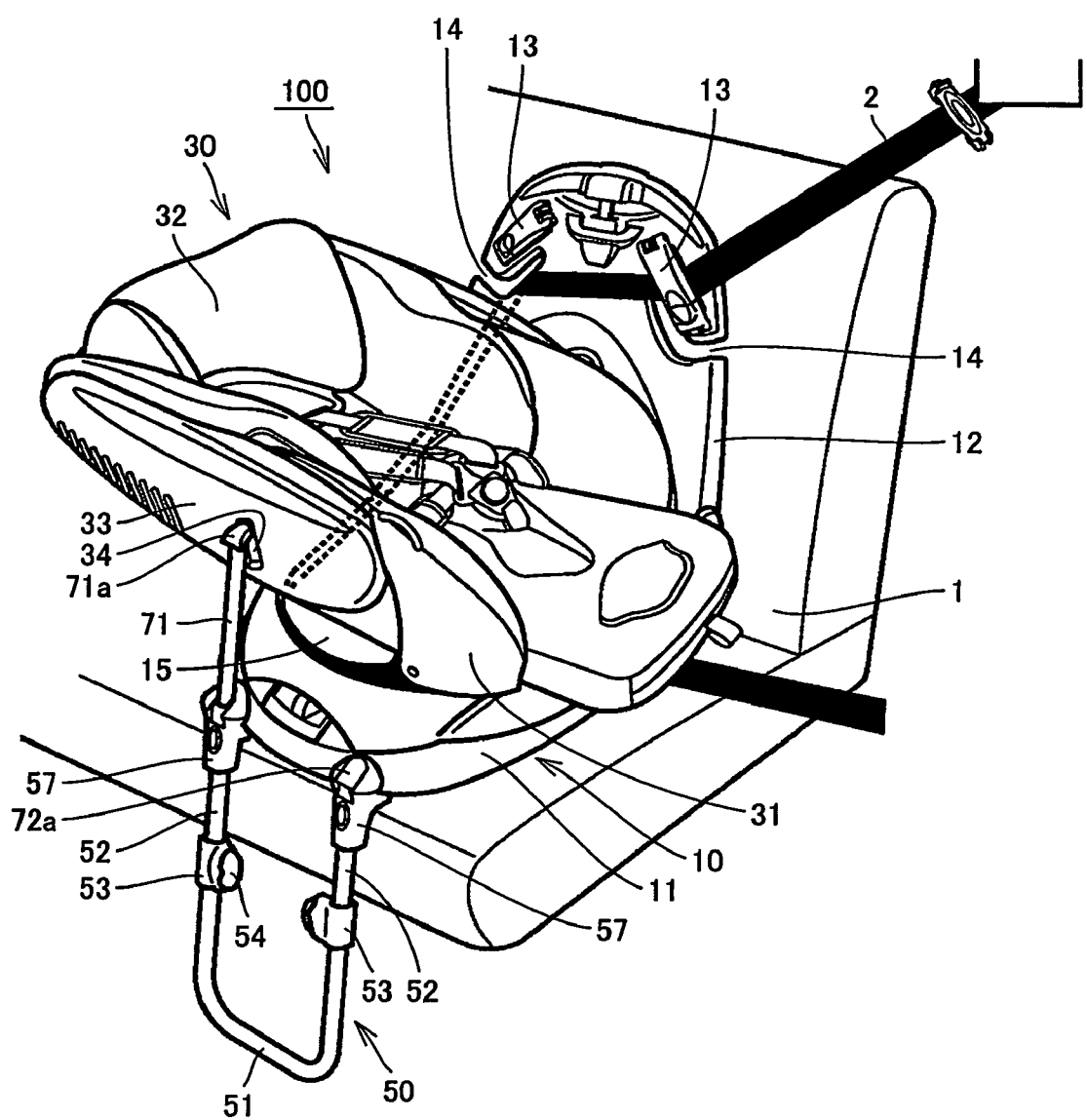
FIG. 2 is a perspective view showing a state in which the child seat is secured to a seat of a vehicle in a sideways facing direction in a bed shape.
Figure 3:
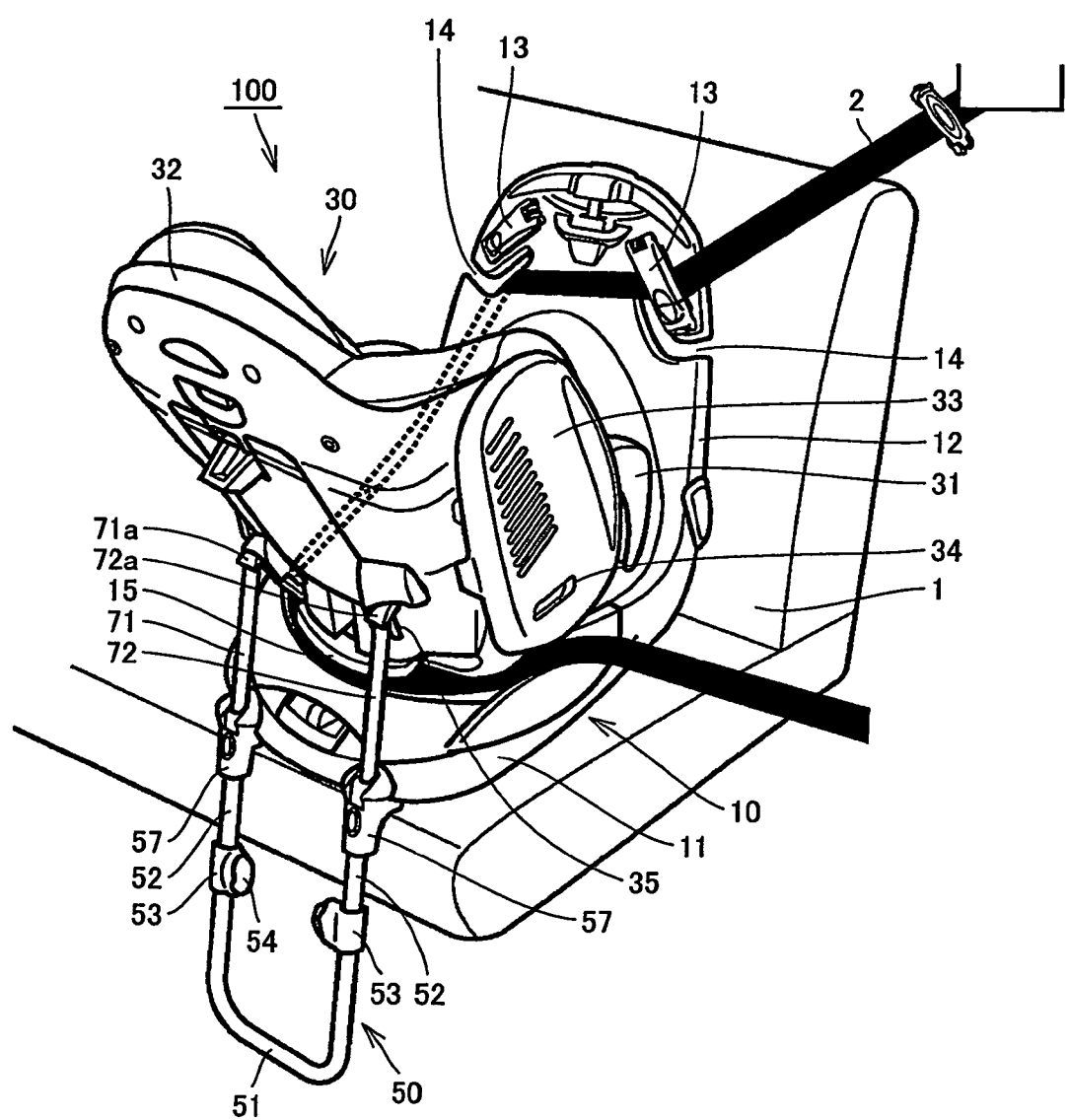
FIG. 3 is a perspective view showing a state in which the child seat is attached to a seat of a vehicle in a rearward facing direction.

FIGS. 1 through 3 show states in which a child seat 100 according to an embodiment of the present invention is secured to a seat 1 of an automobile by using a seat belt 2 mounted on the automobile. The child seat 1 includes a base member 10, a seat body 30, a prop or strut member. i.e. so-called tension member 50, and a support member 70. The base member 10 is fixedly secured to the seat 1 of the automobile by the seat belt 2. The seat body 30 is rotatably attached to the base member 10. The tension member 50 is attached to a front end of the base member 10. The support member 70 is accommodated in the tension member 50 so as to be movable in an up-down direction.

FIG. 1 shows a state in which the seat body 10 is attached in a forward facing direction in a chair shape. FIG. 2 shows a state in which the seat body 10 is attached in a sideways direction in a bed shape. FIG. 3 shows a state in which the seat body 10 is attached in a rearward facing direction in a chair shape.

The base member 10 includes a bottom wall portion 11 positioned on a seat portion of the seat 1 of the automobile and a standing wall portion 12 rising upward from a rear end of the bottom wall portion 11. The standing wall portion 12 abuts on a backrest portion of the seat 1 of the automobile. As can be seen especially from FIGS. 2 and 3, the base member 10 has a clip 13 and a notch 14 in both upper right and upper left sides of the standing wall portion 12. The bottom wall portion 11 of the base member 10 includes a front engagement wall 15 at a position close to the front end of the base member 10 so that the seat belt 2 is wound around the front engagement wall 15. In order to fix the base member 11 to the seat 1 of the automobile, the seat belt 1 has the following layout (threading path): the seat belt 2 is threaded through the clip 13 on one side of the standing wall portion 12 and the notch 14 on the other side thereof and wound around the front engagement wall 15 of the bottom wall portion 11.

The seat belt 1 has the same layout regardless of the direction and shape of the seat body 30. It is therefore not necessary to release the seat belt 2 when the direction and/or shape of the seat body 30 are changed and when a child is placed in or taken out of the seat body 30. Moreover, the above belt layout does not hinder a rotation operation of the seat body 30. The rotation operation of the seat belt 30 can be performed with the seat belt 2 attached at a predetermined position.

The seat body 30 includes a seat portion 31 and a backrest portion 32 rising upward from a rear end of the seat portion 31. The backrest portion 32 is reclinable until the child seat 100 becomes flat like a bed.

The prop or strut member, i.e. tension member 50 attached to the front end of the base member 10 has such a length that the tension member 50 reaches the floor of the automobile, and prevents forward tilting of the base member 10. In the illustrated embodiment, the tension member 50 has a U-shaped outer pipe 51 and two inner pipes 52. The inner pipes 52 are respectively accommodated in longitudinal bar portions of the outer pipe 51 so as to be movable in the up-down direction. A transverse bar portion of the outer pipe 51 is reliably caused to abut on the floor of the automobile by adjusting the extension length of the inner pipes 52.

In the illustrated embodiment, the support member 70 includes a first support bar 71 and a second support bar 72.

The first support bar 71 and the second support bar 72 are respectively accommodated in the inner pipes 52 so as to be movable in the up-down direction. A side engagement portion 34 is provided in the outer surface of both sidewalls 33 of the backrest portion 32 of the seat body 30. Each side engagement portion 34 engages with a corresponding one of head portions 71a, 72a of the first and second support bars 71, 72 when the seat body 30 is positioned in the sideways direction in the bed shape. First and second back engagement portions 35 are provided in the back surface of the backrest portion 32 of the seat body 30. The first and second back engagement portions 35 respectively engage with the head portions 71a, 72a of the first and second support bars 71, 72 when the seat body 30 is positioned in the rearward facing direction.

When the seat body 30 is attached to the base member 10 in the forward facing direction in the chair shape as shown in FIG. 1, the first and second support bars 71, 72 are retracted to a lower position so as to be completely accommodated in the respective inner pipes 52. In this state, the back of the backrest portion 32 of the seat body 30 and the standing wall 12 of the base member 10 are connected in an upper region by a latch mechanism in order to prevent forward tilting of the seat body 30. A conventional known structure may be used for the latch mechanism.

When the seat body 30 is attached to the base member 10 in the sideways direction in the bed shape as shown in FIG. 2, one support bar 71 is extended upward from the tension member 50 so that the head portion 71a at an upper end of the support bar 71 is engaged with the side engagement portion 34 formed in one sidewall 33 of the backrest portion 32 of the seat body 30. This engagement prevents forward tilting of the seat body in the bed shape. When the seat body 30 is positioned in the opposite sideways direction (rotated by 180 degrees), the other support bar 72 is extended upward so that the head portion 72a at an upper end of the support bar 72 is engaged with the side engagement portion 34 of the other sidewall 33.

When the seat body 30 is attached to the base member 10 in the rearward facing direction in the chair shape as shown in FIG. 3, the first and second support bars 71, 72 are extended upward from the tension member 50 so that the head portions 71a, 72a at the upper ends of the first and second support bars 71, 72 are engaged with the back engagement portions 35 formed on the back surface of the backrest portion 32 of the seat body 30.

This engagement prevents forward tilting of the seat body 30 in the rearward facing state.

Hereinafter, a structure of the prop or strut member, i.e. tension member 50 and the support member 70 will be specifically described with reference to FIGS. 4 through 12.

FIGS. 4 through 7 show a state in which the inner pipes 52 of the tension member 50 are completely accommodated in the outer pipe 51 and the support member 70 is retracted to the lower position. Fixed sleeves 53 are respectively attached to upper ends of the pair of longitudinal bar portions of the U-shaped outer pipe 51. An operation lever 54 is attached to each fixed sleeve 53. Each operation lever 54 has a lock pin 55 and is biased by a spring. Each of the pair of inner pipes 52 accommodated in the longitudinal bar portions of the outer pipe 51 so as to be movable in the up-down direction has a plurality of holes 56 formed at intervals in the up-down direction. The extension length of the inner pipe 52, that is, the length by which the inner pipe 52 protrudes upward from the outer pipe 52, is fixed when the lock pin 55 engages in the hole 56.

Figure 8:
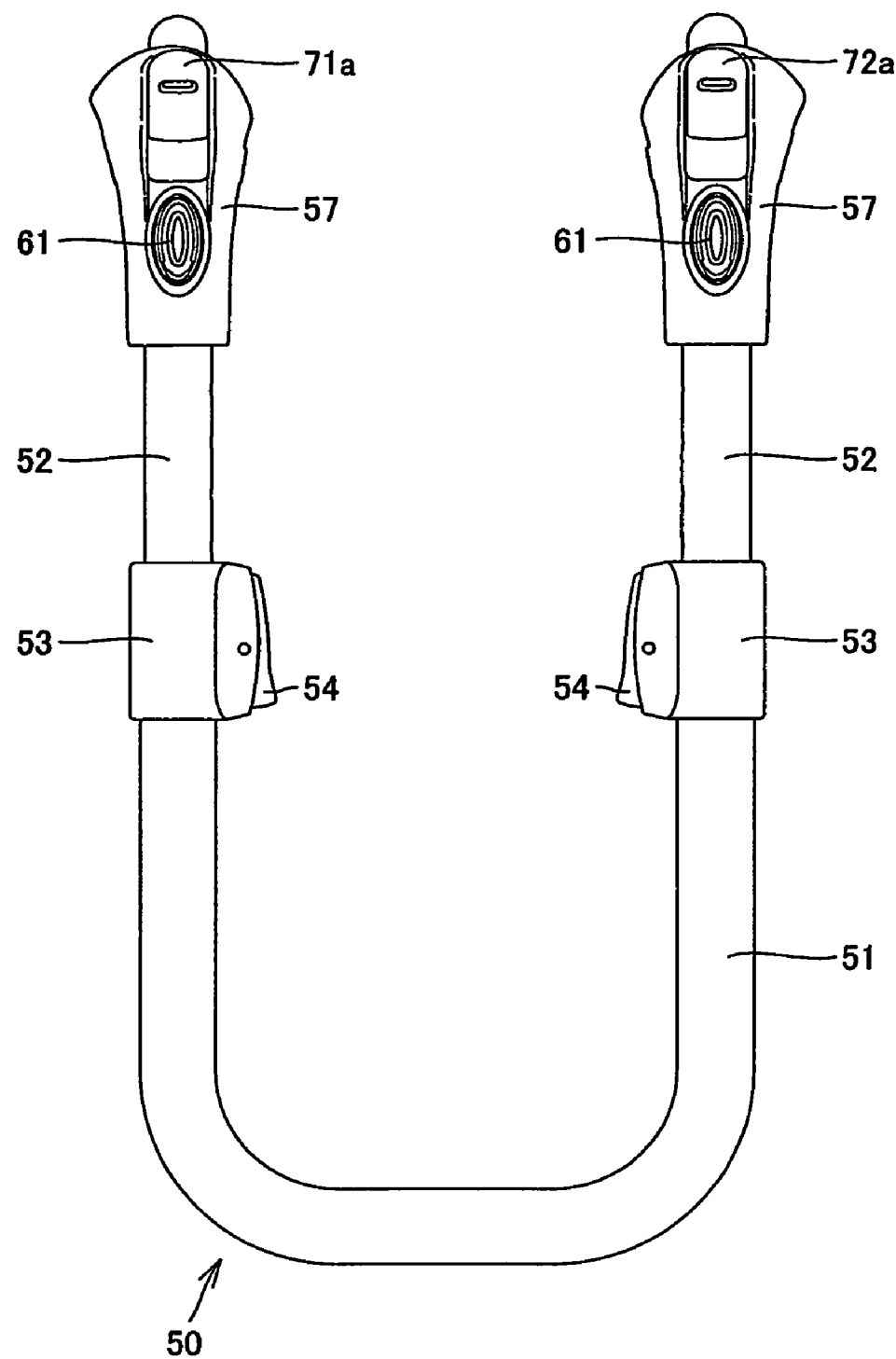
FIG. 8 is a front view showing a state in which inner pipes are extended upward from the state of FIG. 4.
Figure 9:
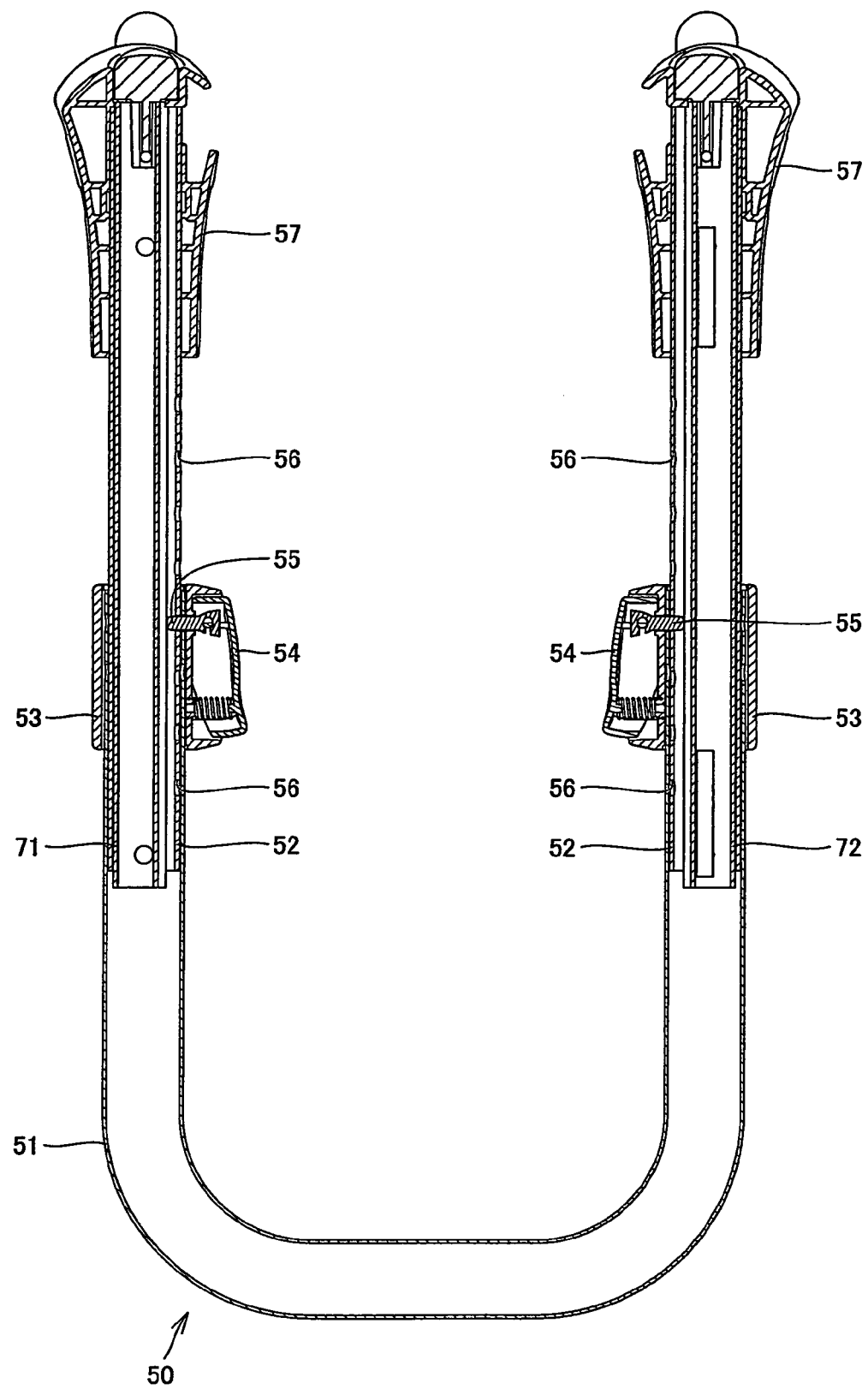
FIG. 9 is a longitudinal cross-section showing a state in which the inner pipes are extended upward from the state of FIG. 6.

FIGS. 8 and 9 show a state in which the outer pipe 51 of the tension member 50 is slid to a lower position in order to reliably make the transverse bar portion of the outer pipe 51 about on the floor of a vehicle.

Figure 4:
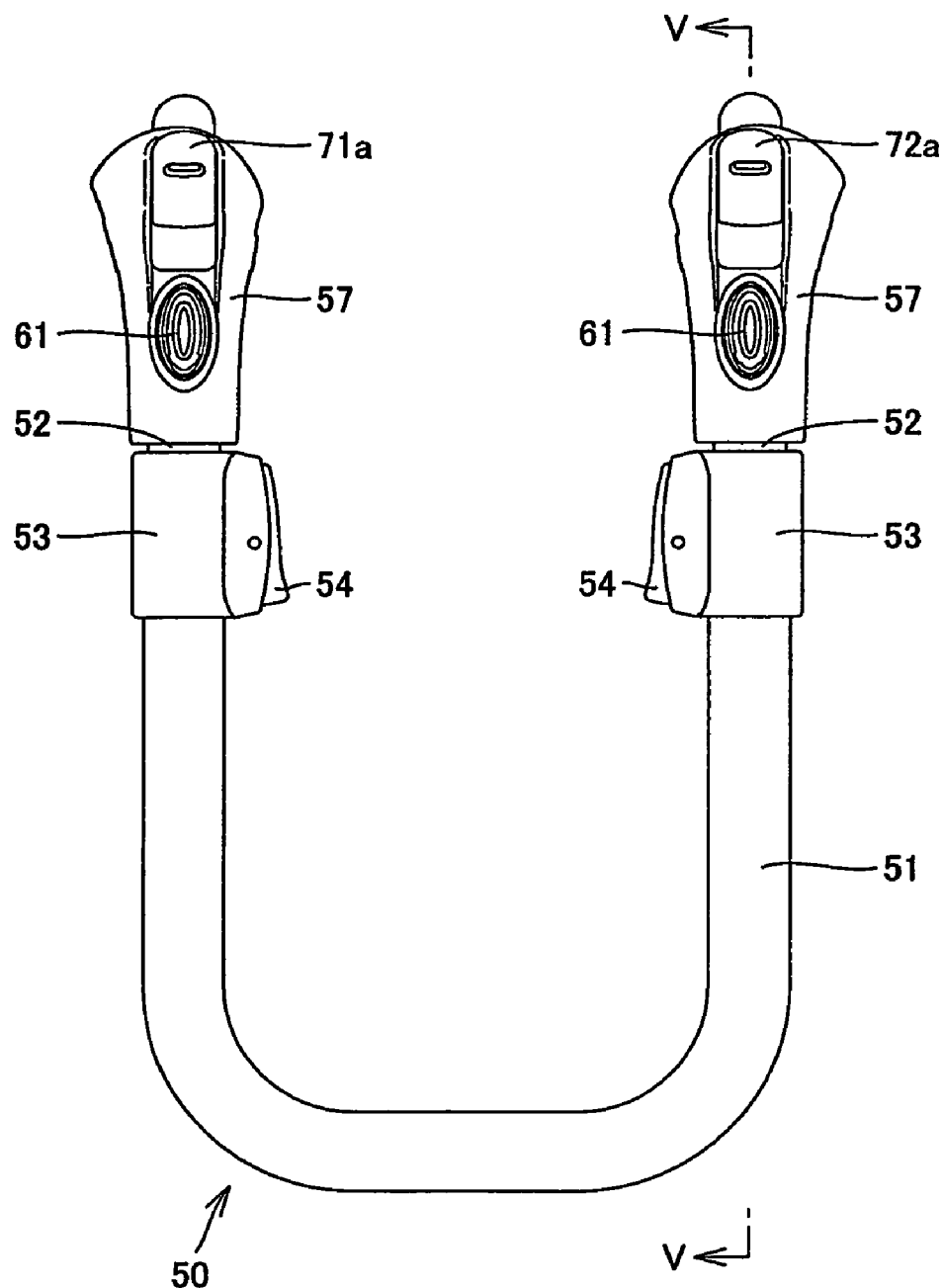
FIG. 4 is a front view of a tension member and a support member.
Figure 6:
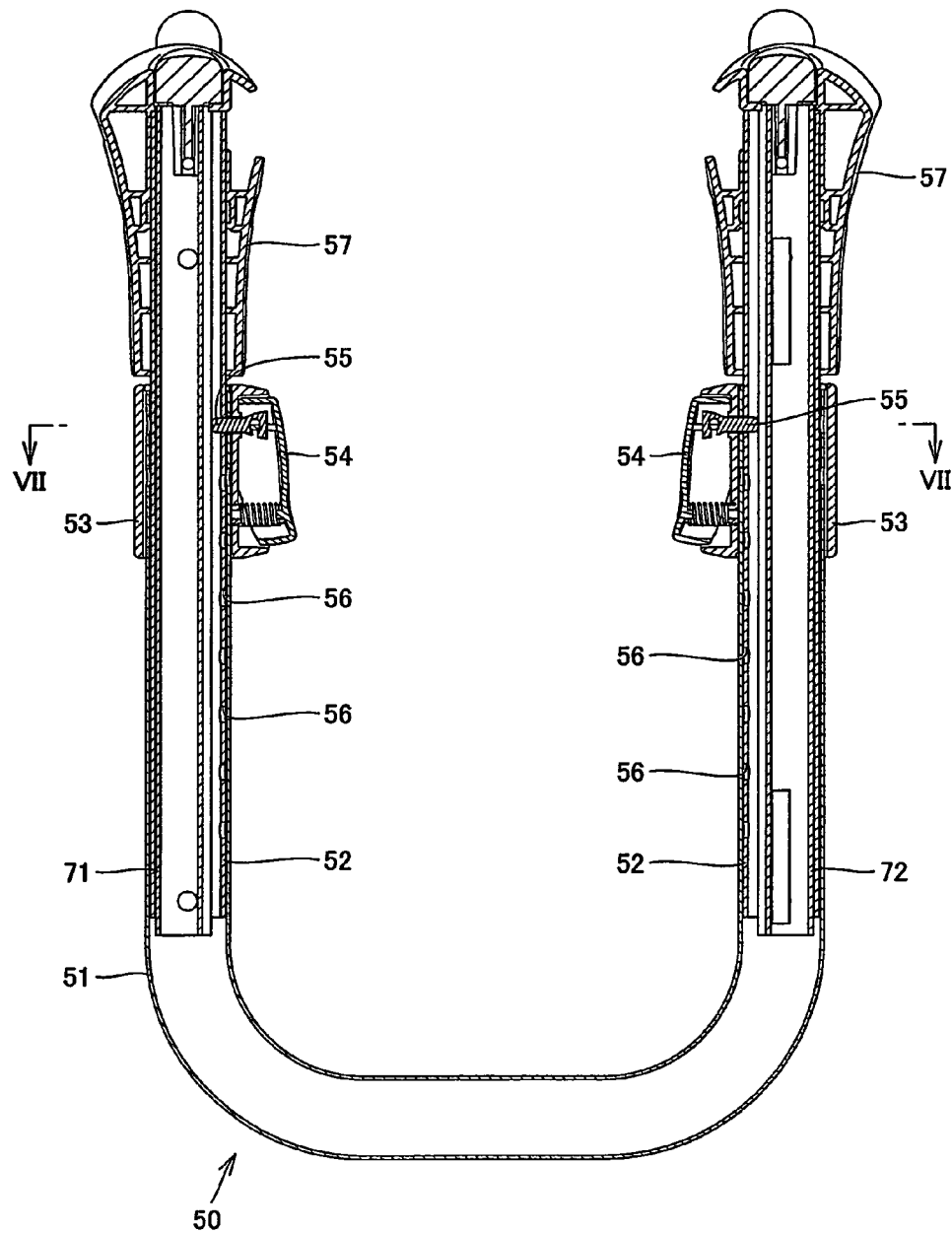
FIG. 6 is a longitudinal cross-section of FIG. 4.
Figure 7:
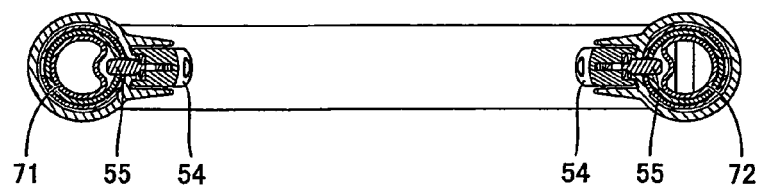
FIG. 7 is a cross-sectional view taken along line VII-VII in FIG. 6.

The following operation is performed to transition the tension member 50 from the state of FIGS. 4 and 6 to the state of FIGS. 8 and 9: first, the pair of operation levers 54 located at the upper ends of the external pipe 51 are pivoted to disengage the lock pins 55 from the holes 56 of the inner pipes 52, respectively. In this state, the outer pipe 51 is slid downward to a predetermined position and the operation levers 54 are released. The pair of operation levers 54 return to an original position by the biasing force of the spring and the pair of lock pins 55 respectively engage in predetermined holes 56 of the inner pipes 52 to inhibit relative movement between the outer pipe 51 and the inner pipes 52.

An attachment bracket 57 having an insertion bar 58 is fixed to an upper end of each inner pipe 52. A lock pin 59 is attached to each insertion bar 58. Each lock pin 59 is always biased by a plate spring 60 so as to return to a lock position. The pair of insertion bars 58 are respectively received by holes formed in the base member 11 of the child seat 100. Although not shown in the figures, the lock pins 59 are respectively engaged in holes formed in the base member 11, thereby inhibiting movement of the insertion bars 58 in a front-back direction. The insertion bars 58 can be detached from the base member 11 by disengaging the lock pins 59 from the holes.

In the illustrated embodiment, the tension member 50 is detachably attached to the base member 11 of the child seat 100 through the insertion bars 58. In another embodiment, however, the tension member may be completely fixed to the base member.

The support member 70 is supported by the tension member 50 so as to be displaceable between upper and lower positions. In the illustrated embodiment, the support member 70 has the first and second support bars 71, 72 which are accommodated in the two inner pipes 52 so as to be movable in the up-down direction. Both support bars have the same structure. The structure of the second support bar 72 will now be described with reference to FIG. 5.

Figure 5:
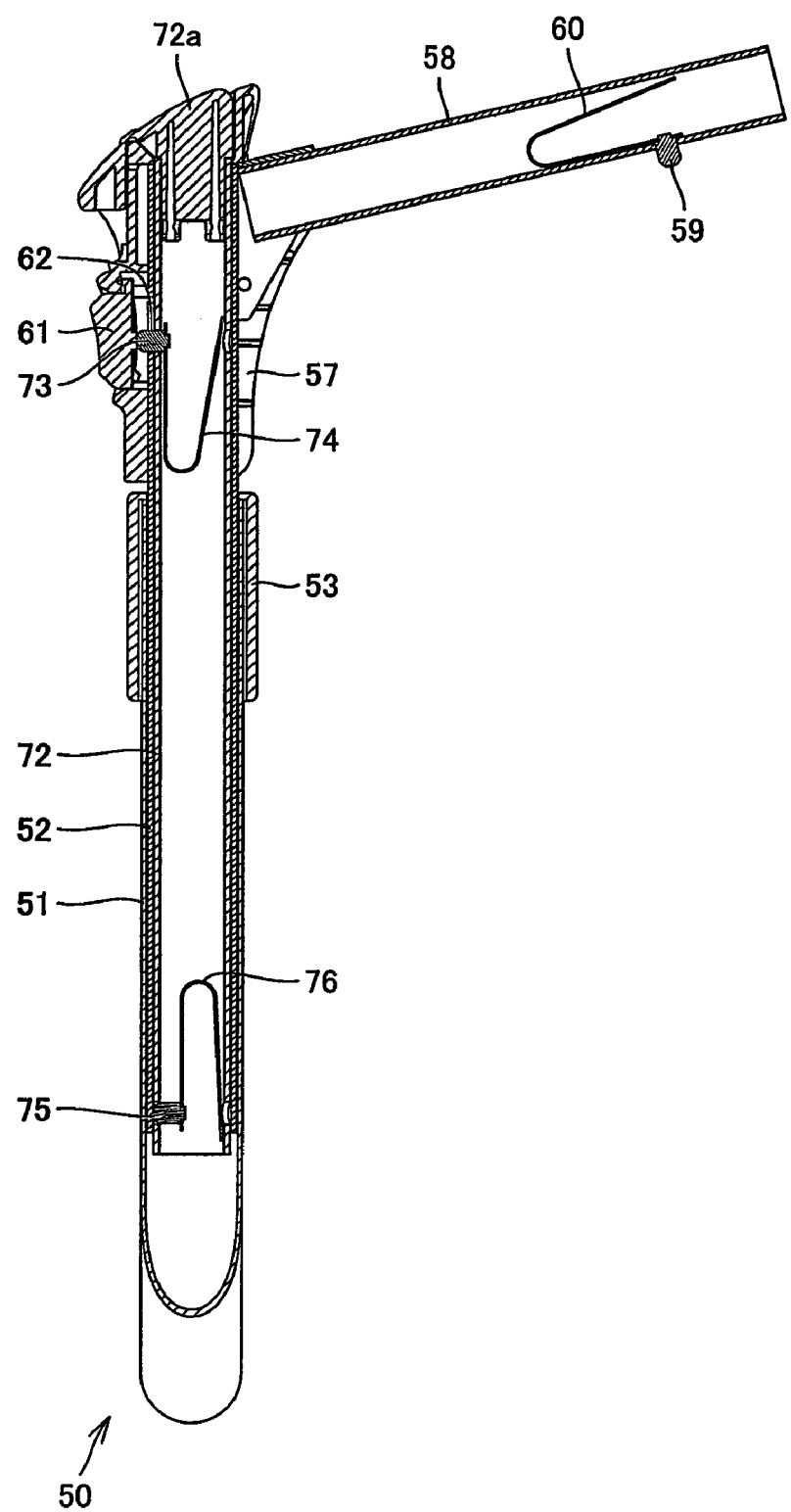
FIG. 5 is a cross-sectional view taken along line V-V in FIG. 4.

The second support bar 72 has an upper lock pin 73 in its upper part and a lower lock pin 75 in its lower part. The upper lock pin 73 is biased by a plate spring 74 and the lower lock pin 75 is biased by a plate spring 76. The inner pipe 52 of the tension member 50 has a receiving hole 62 in its upper portion. The receiving hole 62 is engageable with the upper lock pin 73 and the lower lock pin 75. The attachment bracket 57 fixed to the upper end of the inner pipe 52 has an operation button 61 at a position facing the receiving hole 62. In the state of FIG. 5, the second support bar 72 is in a lower position and the upper lock pin 73 engages in the receiving hole 62 of the inner pipe 52.

Figure 10:
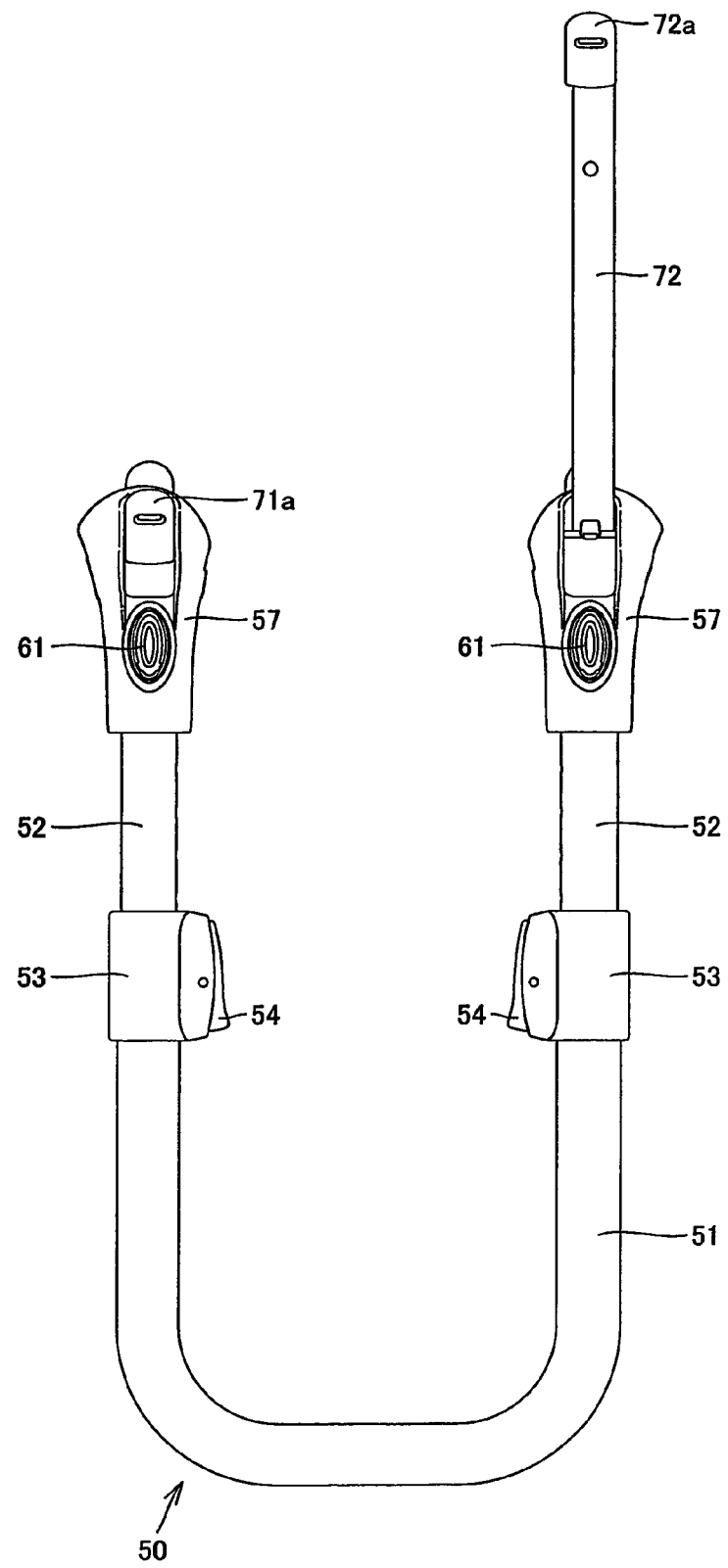
FIG. 10 is a front view showing a state in which a second support bar is extended upward from the state of FIG. 8.
Figure 11:
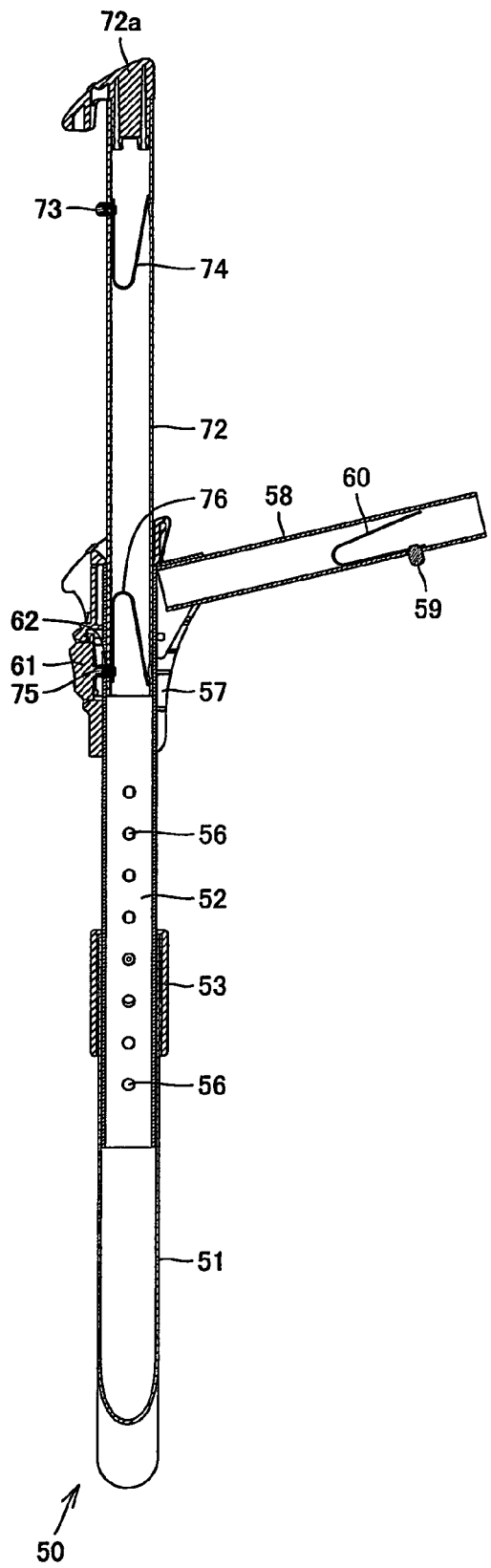
FIG. 11 is a cross-sectional view showing a state in which the inner pipe and the second support bar are extended upward from the state of FIG. 5.

FIGS. 10 and 11 show a state in which the second support bar 72 is brought to an upper position. The following operation is performed to transition the second support bar 72 from the state of FIG. 5 to the state of FIG. 11: first, the operation button 61 of the attachment bracket 57 is pressed with a finger to disengage the upper lock pin 73 from the receiving hole 62. The second support bar 72 is then extended upward to engage the head portion 72a of the second support bar 72 with the side engagement portion 34 of the seat body 30. In this state, the operation button 61 is released, whereby the lower lock pin 75 engages in the receiving hole 62 and the upper position of the second support bar 72 is fixed.

Figure 12:
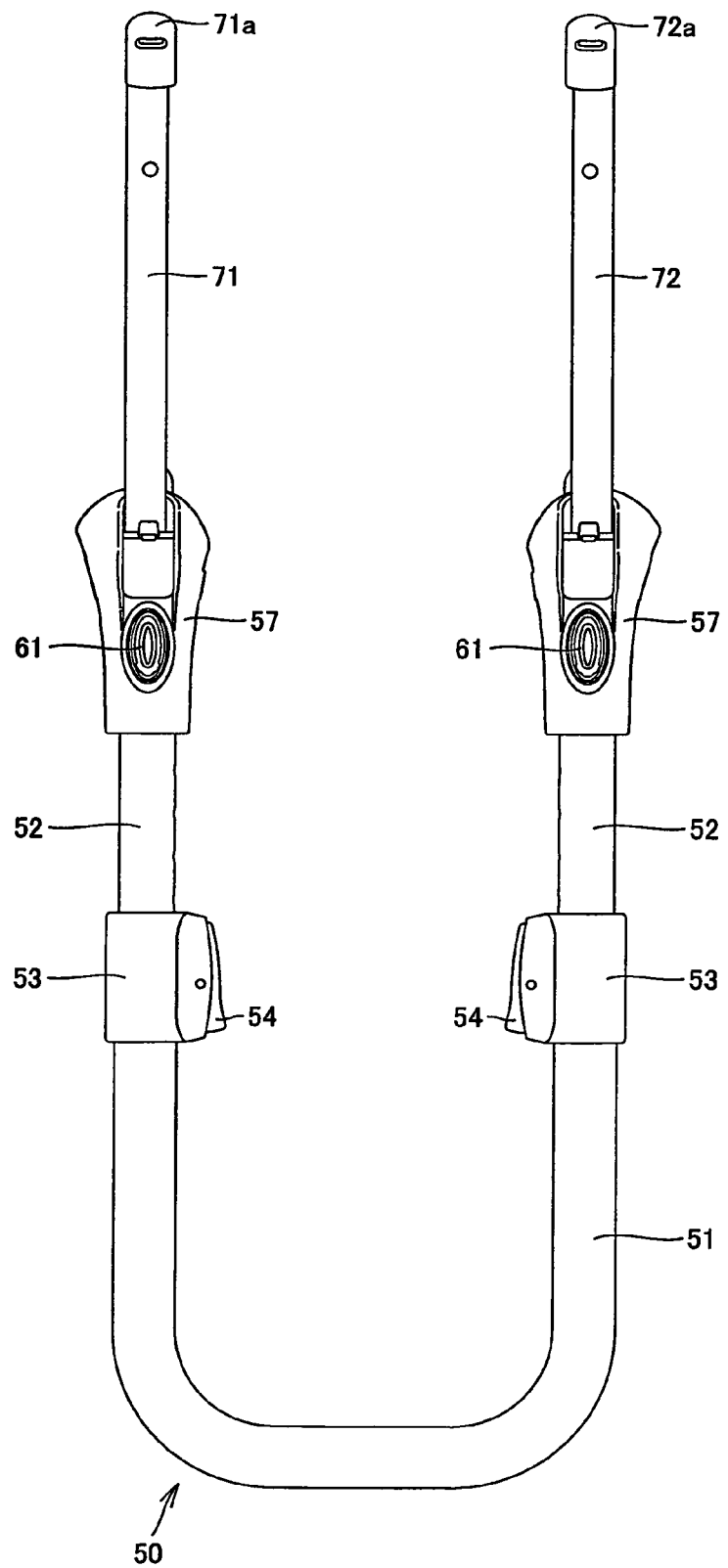
FIG. 12 is a front view showing a state in which first and second support bars are extended upward from the state of FIG. 8.

FIG. 12 shows a state in which the first support bar 71 and the second support bar 72 are both brought to the upper position and fixed. Since an operation to transition the first and second support bars 71, 72 to this state is the same as that described above, description thereof will not be repeated.

Although an embodiment of the present invention has been described above with reference to the figures, the present invention is not limited to the illustrated embodiment. Various modifications and variations can be made to the above illustrated embodiment within the same scope as, or an equivalent scope to, the present invention. Some of such modifications and variations will be described below by way of illustration.

(1) In the illustrated embodiment, the seat body is switchable among the forward facing state, the rearward facing state, and the sideways facing state having the bed shape on the base member. In another embodiment, the seat body may be switchable between two states, that is, the forward facing state and the sideways facing state having the bed shape.

(2) In the illustrated embodiment, the seat body is rotatably supported on the base member and the direction of the seat body is changeable. In another embodiment, the seat body may be detachably attached to the base member.

(3) In the illustrated embodiment, the support member is accommodated in the tension member so as to be displaceable in the up-down direction. In another embodiment, for example, the support member may be attached to an outer surface of the tension member. Alternatively, a foldable or detachable support member may be used instead of the slidable support member.

(4) The shape of the tension member is not limited to the U shape. The tension member may have a single bar shape.

The present invention can thus be advantageously used as an automobile child seat.

What is claimed is:

1. An automobile child seat, comprising:
    a base member fixedly secured to a seat of an automobile;
    a seat body attached to said base member and switchable at least between a forward facing state and a sideways facing state in a bed shape;
    a rigid prop member attached to a front end of said base member and extending downwardly so that said prop member abuts and props against a floor of the automobile; and
    a rigid bar-shaped support member connected to and supported by said prop member so as to be selectively displaceable between and selectively fixable in an upper position and a lower position, wherein
    a side engagement portion is provided in a side surface of said seat body, and said side engagement portion engages with said support member when said support member is brought to and fixed in said upper position in said sideways facing state in the bed shape so that said support member supported by said prop member and engaged with said side engagement portion prevents a forward tilting of said seat body.

2. The automobile child seat according to claim 1, wherein said seat body is switchable to a rearward facing state in addition to said forward facing state and said sideways facing state in the bed shape, a back engagement portion is provided on a back surface of said seat body, and said back engagement portion engages with said support member when said support body is brought to said upper position in said rearward facing state.

3. The automobile child seat according to claim 1, wherein said rigid prop member has a pipe shape, and said rigid bar-shaped support member can be received in said pipe shape of said rigid prop member so as to be displaceable in an up-down direction.

4. The automobile child seat according to claim 1, wherein said rigid prop member has a U shape formed by two longitudinal bar portions extending in an up-down direction and spaced apart from each other and a transverse bar portion connecting respective lower ends of the two longitudinal bar portions to each other, and said rigid bar-shaped support member includes first and second support bars respectively supported by said two longitudinal bar portions so as to be displaceable in the up-down direction.

5. The automobile child seat according to claim 4, wherein a respective one of said side engagement portion is provided respectively in each of two of said side surfaces of said seat body.

6. The automobile child seat according to claim 4, wherein said seat body is switchable to a rearward facing state in addition to said forward facing state and said sideways facing state, first and second back engagement portions are provided on a back surface of said seat body, and said first and second back engagement portions respectively engage with said first and second support bars when said first and second support bars are brought to said upper position in said rearward facing state.

7. The automobile child seat according to claim 1, wherein said seat body is rotatably supported on said base member.

8. An automobile child seat, comprising:
    a base member fixedly secured to a seat of an automobile;
    a seat body attached to said base member and switchable at least between a forward facing state and a rearward facing state;
    a rigid prop member attached to a front end of said base member and extending downwardly so that said prop member abuts and props against a floor of the automobile; and
    a rigid bar-shaped support member connected to and supported by said rop member so as to be selectively displaceable between and selectively fixable in an upper position and a lower position, wherein
    a back engagement portion is provided on a back surface of said seat body, and said back engagement portion engages with said support member when said support member is brought to and fixed in said upper position in said rearward facing state so that said support member supported by said prop member and engaged with said back engagement portion prevents a forward tilting of said seat body.

9. The automobile child seat according to claim 8, wherein said tension rigid prop member has a pipe shape, and said rigid bar-shaped support member can be received in said pipe shape of said rigid prop member so as to be displaceable in an up-down direction.

10. The automobile child seat according to claim 8, wherein said tension rigid prop member has a U shape formed by two longitudinal bar portions extending in an up-down direction and spaced apart from each other and a transverse bar portion connecting respective lower ends of the two longitudinal bar portions to each other, and said rigid bar-shaped support member includes first and second support bars respectively supported by said two longitudinal bar portions so as to be displaceable in the up-down direction.

11. An automobile child seat, comprising:
    a base member fixedly secured to a seat of an automobile;
    a seat body attached to said base member;

a rigid prop member attached to a front end of said base member and extending downwardly downwardly so that said prop member abuts and props against a floor of the automobile; and a rigid bar-shaped support member connected to and supported by said prop member so as to be selectively displaceable between and selectively fixable in an upper position and a lower position, wherein an engagement portion is provided on said seat body, and said engagement portion engages with said support member when said support member is brought to and fixed in said upper position so that said support member supported by said prop member and engaged with said engagement portion prevents a forward tilting of said seat body.

* * * * *

UNITED STATES PATENT AND TRADEMARK OFFICE
CERTIFICATE OF CORRECTION

PATENT NO. : 7,753,445 B2 Page 1 of 1
APPLICATION NO. : 12/315768
DATED : July 13, 2010
INVENTOR(S) : Kenzou Kassai and Haruo Kawano It is certified that error appears in the above-identified patent and that said Letters Patent is hereby corrected as shown below:

Column 8
claim 8, line 39, please delete "rop" and replace with --prop--.

Signed and Sealed this

Twenty-fourth Day of August, 2010

David J. Kappos
*Director of the United States Patent and Trademark Office*